2,854,390

METHOD OF MAKING CADMIUM NIOBATE

William McNeill, Philadelphia, and George F. Nordblom, Cheltenham, Pa., assignors to the United States of America as represented by the Secretary of the Army No Drawing. Application April 22, 1958
Serial No. 730,236

3 Claims. (Cl. 204—96)

(Granted under Title 35, U. S. Code (1952), sec. 266)

The invention described herein may be manufactured and used by or for the Government for governmental purposes without the payment of any royalty thereon.

This invention relates to an electrochemical deposition of a film of cadmium and niobium oxides wherein an electric breakdown occurs at the anode resulting in sparking which is utilized in the formation of cadmium niobate.

Under the prior art cadmium niobate was prepared by firing a mixture of cadmium carbonate, cadmium oxide and niobium pentoxide in a furnace at a temperature of the order of 1100° C. This ceramic method of preparation is unsatisfactory because cadmium oxide is volatile at this temperature and is often lost in the reaction resulting in an inferior grade of cadmium niobate.

One of the objects of this invention is to obtain the above ceramic effect by means of the sparking at the anode to prevent volatilization of the cadmium oxide.

Another object of this invention is to obtain a controlled deposition of cadmium niobate in a simplified manner.

Other objects of our invention will appear from the following detailed description.

Under certain conditions, cadmium may behave like one of a group of metals consisting of aluminium, magnesium, and tantalum which exhibits valve properties. These metals when made anodic in suitable solutions, allow electric current to flow freely in one direction but greatly impede the flow of current in the opposite direction. This is due to the formation of an electrical barrier layer on the surface of the anode. The thickness of this layer is controlled by the voltage at which it is formed and is characteristic of the metal and solution used. For each such valve system there is a maximum voltage above which normal coating growth cannot occur. If this voltage is exceeded, electric breakdown follows and, in many cases sparking is observed on the anode surface. In the case of cadmium, valve properties and sparking are difficult to observe, but it was found that when cadmium was anodized in niobate solution, a spark reaction was obtained on the cadmium surface, and cadmium niobate was formed.

An aqueous solution of potassium niobate is prepared by dissolving the fusion product of potassium carbonate and niobium pentoxide in water. The solution is made 0.04 molar in potassium niobate. This solution is the electrolyte in which cadmium metal is anodized. The cadmium metal is most conveniently used in the form of round rods which are protected at the electrolyte level by a close-fitting sheath of polytetrafluorethane known in the trade as Teflon. This protective cover permits anodizing to be continued for long periods of time under the surface of the electrolyte at voltages which are well in excess of the spark voltage. Teflon proved satisfactory to overcome a difficulty encountered when plastic insulating tape was employed. The tape became charred and was undercut by the electrolyte. This resulted in its rapid failure which produced unsatisfactory results.

The anodizing procedure is as follows:

(1) The cadmium rod is partly immersed in the electrolyte and made the anode. An inert cathode is the other electrode, in the solution completing the circuit through which is passed a direct current. Niobium was used for the cathode because it was conveniently available. It was considered sufficiently inert for this purpose. There was no visible evidence of attack on the cathode.

(2) The voltage is applied and progressively increased to maintain the current density at a strength of at least 0.25 ampere per square inch. The starting point is zero volts and as the film grows the voltage is increased up to a final voltage of about 250 volts. It is at this point that the niobate formation process attains a fairly constant rate. An electrolyte temperature of 15° C. is used because valve effects, being dependent on temperature, are more pronounced at lower temperatures.

In the early stages of anodizing below about 80 volts, a yellow-brown film believed to be oxides of cadmium and niobium grows on the cadmium surface and the voltage must be progressively increased to maintain the anode current density at a value of at least 0.25 ampere/sq. inch. At about 80 volts gas bubbles, presumably oxygen, appear on the anode film, indicating that non-uniform film growth is beginning. As the voltage is increased this becomes more pronounced and is accompanied by localized roughening of the coating and sparking which may or may not be visible.

The rough areas increase in size and thickness as the voltage is increased, and finally in the range where the sparking occurs the pieces of the rough anode film break away from the anode and the exposed surface becomes available for the formation of more anode product. Thus an approximately steady state is reached wherein new anode product is formed at a rate which is balanced by the separation of material from the anode. The sparking of the film oxides of cadmium and niobium is what results in the formation of the cadmium niobate. It is not necessary that this steady state be attained in order to practice the invention, but mention of it is made in order that the overall utility may be enhanced. It is to be noted that prior to this invention it was felt that anodic sparking was a phenomenon in electrochemical depositions to be avoided since it tends to break apart the film and ruin it. However, in this invention it is the sparking that is utilized to produce a specific ceramic material.

The cadmium niobate is collected at the bottom of the electrolyte, then filtered and washed with water to remove soluble impurities and then heated for a short time to promote crystal growth. In the practice of this invention a heating time of two hours at 650° C. followed by a gradual cooling to 300 to 400° C. over a period of three hours has been used successfully.

The crystallized product is shown to be cadmium niobate by X-ray and electrical analysis. The crystallized product may be compressed to a solid by using pressures upward of 300,000 p. s. i. The resultant material is somewhat vitreous in appearance, and can be used as a dielectric material between suitable electrode plates.

Its dielectric constant and dissipation factor are about 600 and 0.01 respectively when measured at 20 kilocycles frequency. These properties are frequency sensitive both increasing as frequency is decreased.

It is thought that this disclosure opens the way in the new field of anodic spark reactions in the preparation of complex oxides for use as pigments, catalysts, protective coatings for high temperature metals, semiconductors, ferroelectrics, and dielectrics.

Having described our invention, what we desire to secure by Letters Patent is:

1. A process for the manufacture of cadmium niobate, which comprises introducing a cadmium anode into an electrolyte having niobate anions, adjusting the concentration of said anions to at least about .02 molar, insulating the cadmium anode to prevent creepage of the electrolyte above the liquid, passing a direct current through a cathode inert to the electrolyte in circuit with the electrolyte and the cadmium anode, depositing a film of oxides of cadmium and niobium onto the anode, maintaining a current density at a value of at least 0.25 ampere/square inch, increasing the voltage from zero to 250 volts in order to maintain current density at said limit as the said film grows thereby breaking down the film under increased voltage with sparking in the said anode film in the liquid atmosphere to form cadmium niobate in response to heat of sparking, collecting particles of cadmium niobate at the bottom of the electrolyte, filtering and washing powdered cadmium niobate.

2. A process according to claim 1 which comprises heating the powdered cadmium niobate in a furnace for two hours at 650° C., cooling the cadmium niobate at a rate of about 3° C./minute to promote crystal growth.

3. A process according to claim 1 in which the electrolyte is a .04 molar solution of potassium niobate.

References Cited in the file of this patent

UNITED STATES PATENTS

| | | |
|---|---|---|
| 1,537,053 | Young | May 5, 1925 |
| 2,132,438 | Romig | Oct. 11, 1938 |
| 2,331,402 | Leete | Oct. 17, 1943 |
| 2,720,488 | Dwyer | Oct. 11, 1955 |

FOREIGN PATENTS

| | | |
|---|---|---|
| 510,380 | Germany | Oct. 18, 1930 |

OTHER REFERENCES

Transactions of the Electrochemical Society, Vol. 63, 1933, pages 419–423.